US008762242B2

(12) United States Patent
McLean (10) Patent No.: US 8,762,242 B2
(45) Date of Patent: Jun. 24, 2014

(54) METHOD AND SYSTEM FOR POOLING COMPUTING SERVER RESOURCES

(75) Inventor: John George Bruce McLean, Toronto (CA)

(73) Assignee: FTSE TMX Global Debt Capital Markets Inc., Toronto (CA)

( * ) Notice: Subject to any disclaimer, the term of this patent is extended or adjusted under 35 U.S.C. 154(b) by 38 days.

(21) Appl. No.: 13/130,457

(22) PCT Filed: Nov. 21, 2008

(86) PCT No.: PCT/CA2008/002053
§ 371 (c)(1),
(2), (4) Date: May 20, 2011

(87) PCT Pub. No.: WO2010/057289
PCT Pub. Date: May 27, 2010

(65) Prior Publication Data
US 2011/0231301 A1     Sep. 22, 2011

(51) Int. Cl.
*G06Q 40/00* (2012.01)

(52) U.S. Cl.
USPC .............................................. 705/35; 705/38

(58) Field of Classification Search
USPC ......................................................... 705/35
See application file for complete search history.

(56) References Cited

U.S. PATENT DOCUMENTS

| 5,375,055 A | 12/1994 | Togher et al. | |
| 6,278,982 B1 * | 8/2001 | Korhammer et al. | 705/36 R |
| 6,282,521 B1 * | 8/2001 | Howorka | 705/36 R |
| 7,356,501 B2 * | 4/2008 | Churquina | 705/37 |
| 7,496,531 B1 * | 2/2009 | Gastineau et al. | 705/35 |
| 7,584,140 B2 * | 9/2009 | Brady et al. | 705/37 |
| 7,716,114 B2 | 5/2010 | Hirani et al. | |
| 7,966,249 B1 * | 6/2011 | Dawson et al. | 705/37 |
| 2002/0128945 A1 * | 9/2002 | Moss et al. | 705/37 |
| 2004/0093301 A1 | 5/2004 | Fitzpatrick et al. | |
| 2005/0119964 A1 | 6/2005 | Brady et al. | |
| 2006/0080219 A1 | 4/2006 | Lutnick et al. | |

FOREIGN PATENT DOCUMENTS

| CN | 1443334 A | 9/2003 |
| WO | 2006/109306 A2 | 10/2006 |

OTHER PUBLICATIONS

Chinese Office Action dated Jul. 30, 2012.
English translation of Office Action dated Sep. 5, 2013 issued by the Chinese Patent Office in respect of corresponding Chinese Patent Application No. 200880132056.5.

* cited by examiner

*Primary Examiner* — Kirsten Apple
(74) *Attorney, Agent, or Firm* — Perry + Currier Inc.

(57) ABSTRACT

A method and system for pooling computing resources is provided. In an embodiment a system comprises a plurality of quotation servers connected to a quotation engine. The quotation is also connected to a clearing server. The quotation engine receives data representing quotations from different servers. The quotation engine also receives data representing actual trades from the clearing server. The quotation engine is configured to perform operations on the quotations and the actual trades in a fashion that deletes certain quotations to reduce consumption of computing resources on the quotation engine and thereby increase efficiency of processing of the quotes to arrive at a final quotation. The system also relieves processing burden on the quotation servers by shifting the processing to the quotation engine.

28 Claims, 10 Drawing Sheets

METHOD AND SYSTEM FOR POOLING COMPUTING SERVER RESOURCES

FIELD

The present specification relates generally to electronic trading platforms and more particularly relates to a computer-based method and system for pooling computing server resources.

BACKGROUND

Electronic trading is offered in many different markets, and is a well known means of matching orders to buy and sell items in the market. Matched orders can be then be electronically "executed" in order to implement those matched orders. Electronic trading platforms necessarily require technical resources in order to effect these electronic trades. Ongoing optimization of the hardware and software resources of electronic trading platforms has the technical effect of reducing loads on those hardware and software resources, and at the same time leading to an overall improvement in quality of electronic trades, such quality being indicated by speed (e.g. reduced network latency), efficiency (e.g. reduced processing resources on a central processing unit, reduced electronic memory consumption), accuracy (e.g. the actual quoted value for a given item is correct) and the like.

Different types of electronic trades are characterized by different data record structures that represent the traded instrument. Such variations in data record structures lead to unique technical structures and configurations that correspond to the different types of electronic trades. Furthermore, the network interconnections between servers involved in the electronic trading, and the configuration of the hardware and software processes on those electronic trading servers also impacts the quality of different types of electronic trades.

One type of electronic trading is characterized by data records that are structured to represent bonds. Bond data records are often maintained in different formats within different computing environments that are each maintained by different dealers. Electronic quotations associated with bond data records need to be updated on a periodic basis, typically daily, and made available to all dealers of bonds associated with certain bond data records.

In certain current configurations, one example of which is the electronic trading of bonds in Canada, computing environments maintained by certain trading firms or dealers rely only on electronic trading data associated with that one computing environment, and do not interact with electronic trading data associated with computing environments maintained by other dealers. This leads to electronic quotations within the computing environment of one dealer that are heterogeneous in relation to the electronic computing environments of other dealers. In other configurations, computing environments of different dealers may be networked in some fashion or another, so that electronic trading data of all dealers can be examined to ascertain an electronic quote respective to a complete set of bond data records respective to a given bond as maintained in computing environments associated with the participating dealers. However, excessive computing resources can be consumed in examining all bond data records respective to a given bond. Furthermore, excessive consumption of computing resources can also interfere with other networked computing resources that are dedicated to ultimately effecting electronic trades based on timely and meaningful electronic quotes. It is therefore desirable to reduce the computing resource burden associated with examining and processing bond data records respective to a given bond in order to generate an electronic quote for that bond.

SUMMARY

An aspect of the specification provides a system for pooling computing server resources comprising a plurality of quotation servers. Each of the quotation servers are configured to maintain a dealer data record comprising a quotation for a bond. Each of the dealer data records are different than each other dealer data record. The system also comprises a clearing server configured to maintain a clearing data record comprising an actual traded value for the bond. The system also comprises a quotation engine connected to the quotation servers and the clearing server. The quotation engine is configured to receive the dealer data records and the clearing data record. The quotation engine is configured to perform a plurality of operations based on the dealer data records and the actual traded value. The operations are configured to successively delete one or more of said dealer data records. The quotation engine is configured to perform a final price determination based on the dealer data records that survive the deletions.

DETAILED DESCRIPTION OF THE EMBODIMENTS

Figure 1:
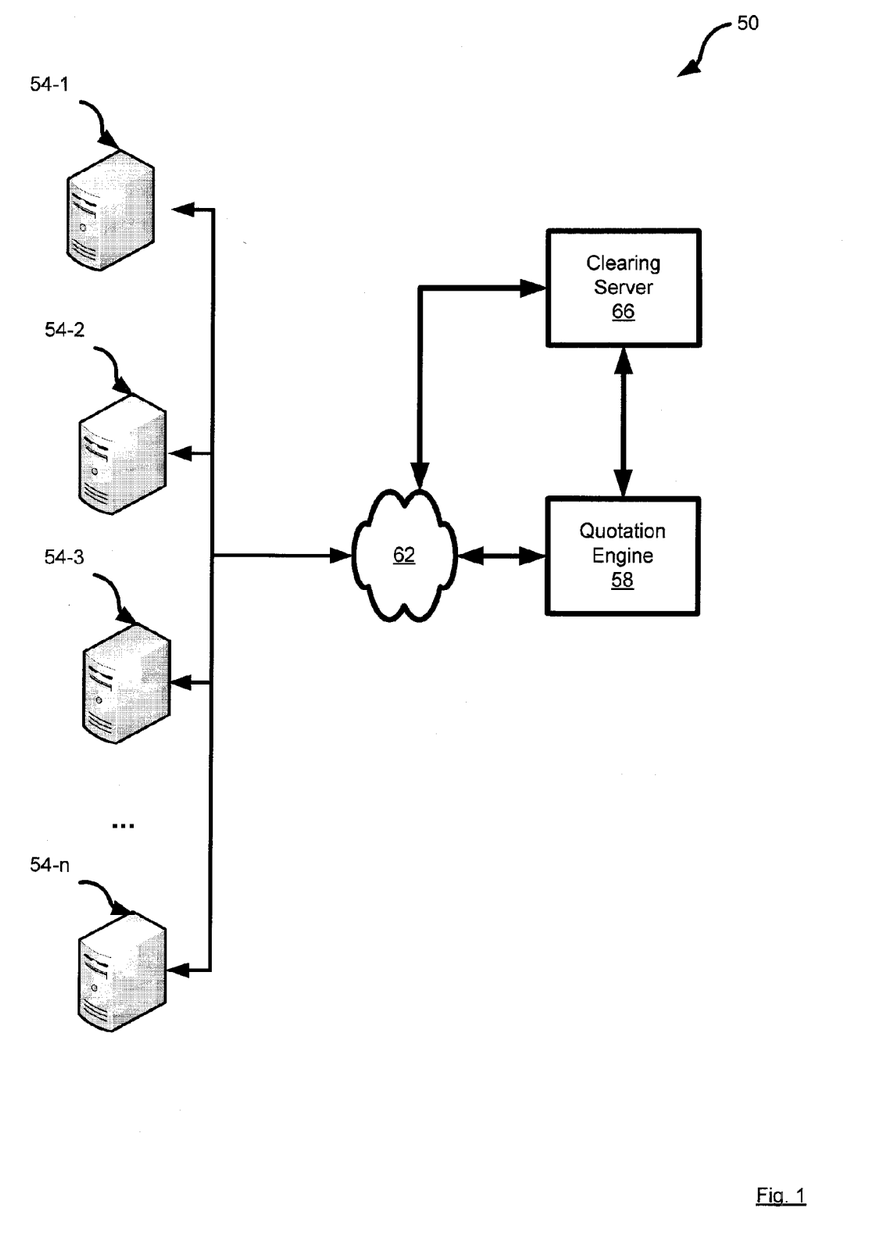
FIG. 1 shows a system for pooling computing server resources in accordance with an embodiment.

Referring now to FIG. 1, a system of pooled computing resources is indicated generally at 50. System 50 comprises a plurality of quotation servers 54-1, 54-2, 54-3 . . . 54-n (generically referred to herein as "server 54" and collectively as "servers 54") all of which are connected to a quotation engine 58 via any suitable network 62. System 50 also comprises a clearing server 66 that connects directly to quotation engine 58 and to network 62.

Each server 54 is typically a server or mainframe with a housing containing an arrangement of one or more central processing units, volatile memory (i.e. random access memory), persistent memory (i.e. hard disk devices) and a network interface (to allow each server 54 to communicate over network 62) all of which are interconnected by a bus. For example, each server 54 can be a Sun Fire V480 running a UNIX operating system, from Sun Microsystems, Inc. of Palo Alto Calif., having four central processing units each operating at about 900 megahertz and having about sixteen gigabytes of random access memory. However, it is to be emphasized that this particular server is merely exemplary, and an array of other types of computing environments for quotation engine 54 are within the scope of the invention, and in fact it is expected that each server 54 would have a different computing environment. Each server can include a keyboard or mouse (or other input devices), a monitor (or other output device). Each server 54 is typically maintained as part of computing environment associated with a different dealer, and therefore each server 54 is typically different, in that different configurations of processors, memory, operating systems and software are implemented on each server 54. Each server 54 is typically connected to other computing infrastructure associated with the dealer, including trading screens, printers, file servers and the like. As will be explained further below, each server 54 is configured to maintain electronic data records representing quotations of different bonds, and to forward those electronic data records to quotation engine 58.

Quotation engine 58 is a server or a mainframe with a housing containing an arrangement of one or more central processing units, volatile memory (i.e. random access memory), persistent memory (i.e. hard disk devices) and a network interface (to communicate over network 62 with servers 54) all of which are interconnected by a bus. For example, quotation engine 58 can be a Sun Fire V480 running a UNIX operating system, from Sun Microsystems, Inc. of Palo Alto Calif., having four central processing units each operating at about 900 megahertz and having about sixteen gigabytes of random access memory. However, it is to be emphasized that this particular server is merely exemplary, and an array of other types of computing environments for quotation engine 58 are within the scope of the invention. In a present embodiment, quotation engine 58 is connected to a primary persistent storage device (not shown) that maintains persistent data associated with electronic data records received from servers 54 and from clearing server 66. As will be explained further below, quotation engine 58 is configured to generate an electronic data record representing a final quotation for a given bond.

Network 62 can be wired or wireless, or based on combinations thereof, and based on any type of known network architecture or platform, (e.g. the Internet or a wide area network) or combinations thereof. Generally network 62 provides an infrastructure to interconnect engine 58, server 66 and servers 54.

Clearing server 66 is also maintained on a server, mainframe or other computing environment and is associated with a broader electronic exchange for trading, and is configured to maintain electronic data records representing booked trades of bonds, and to forward those data records to quotation engine 58.

Figure 2:
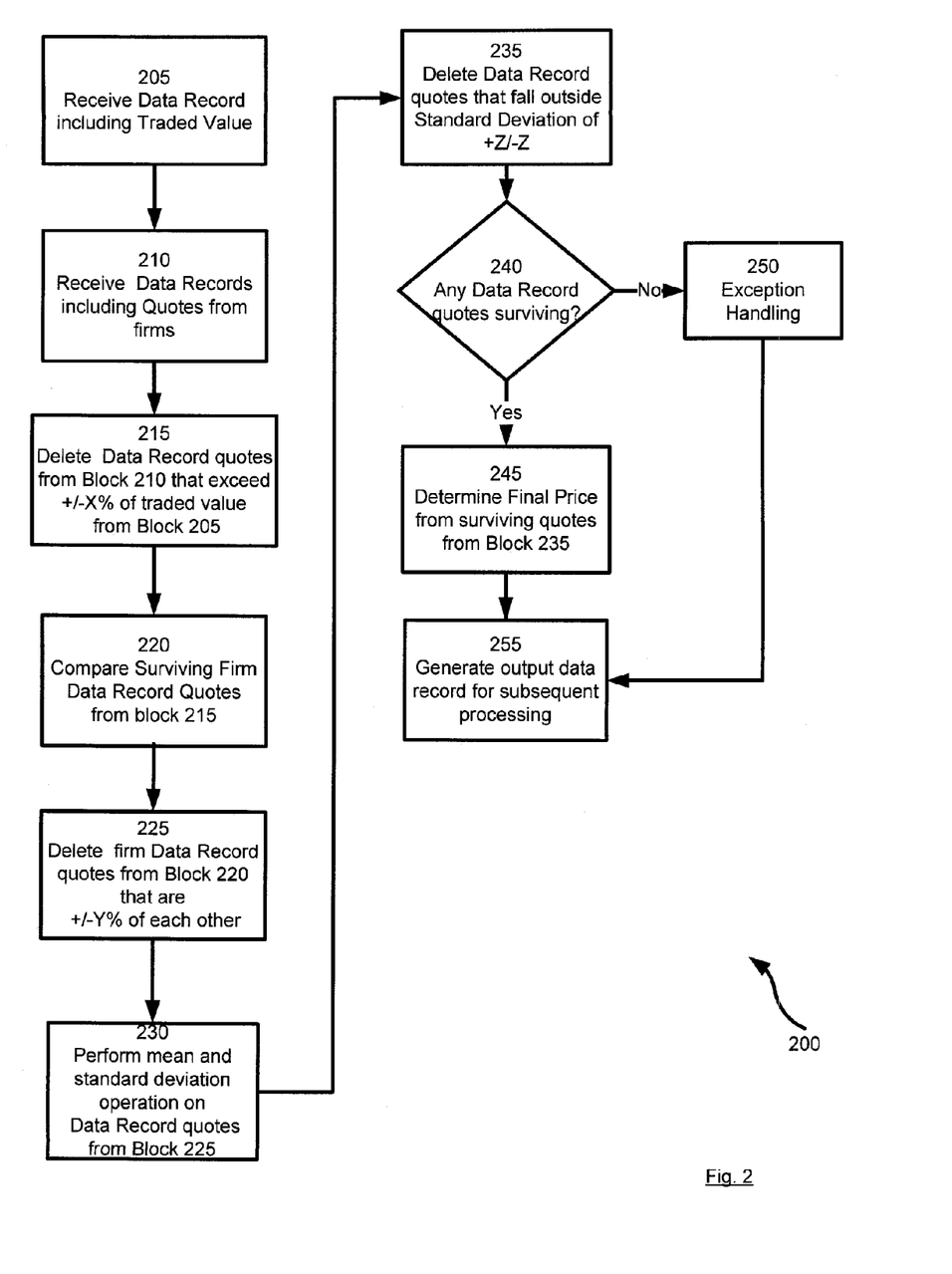
FIG. 2 shows a flow-chart depicting a method for pooling computing server resources in accordance with another embodiment.

Referring now to FIG. 2, a method for pooling computing resources in accordance with another embodiment of the invention is represented as a flow-chart and indicated generally at 200. In order to assist in the explanation of the method, it will be assumed that method 200 is performed using system 50. Furthermore, the following discussion of method 200 will lead to further understanding of system 50 and its various components. However, it is to be understood that system 50 and/or method 200 can be varied, and need not work exactly as discussed herein in conjunction with each other, and that such variations are within the scope of the present invention.

Figure 3:
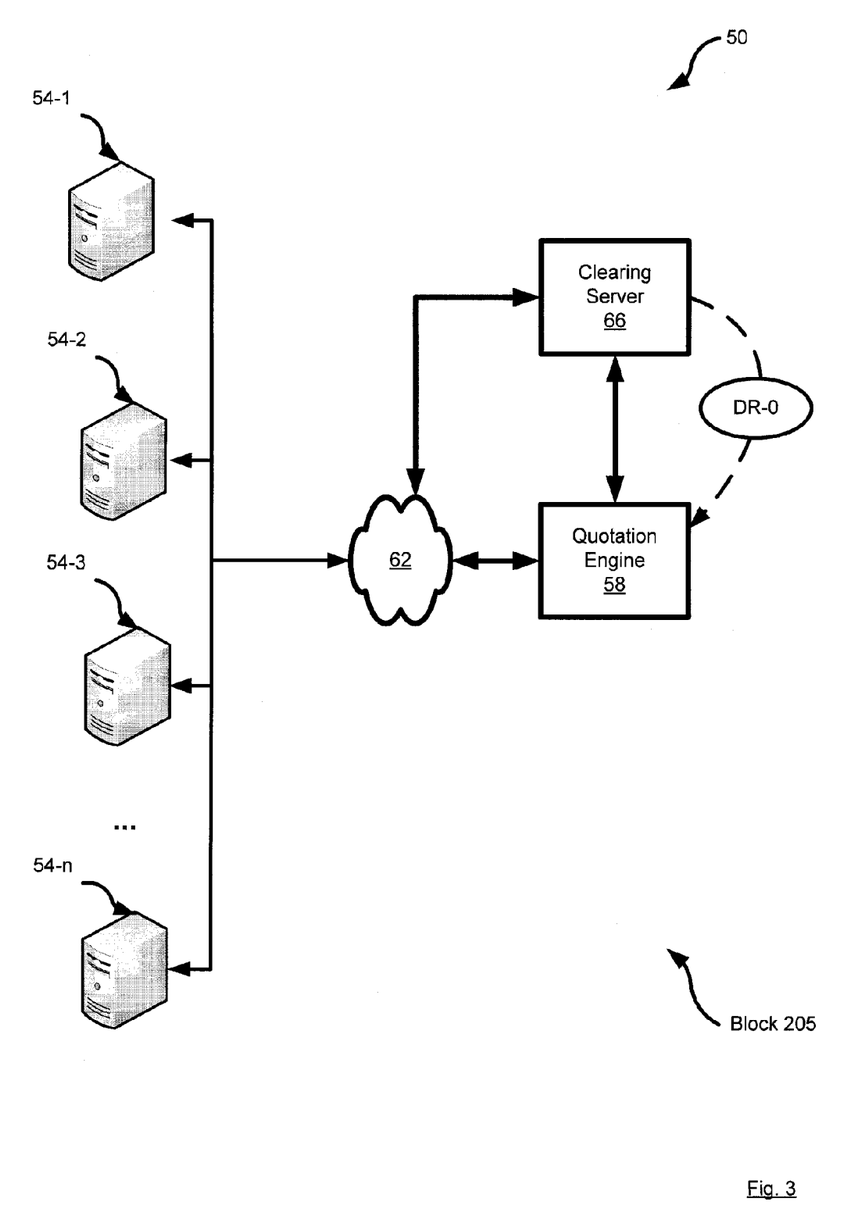
FIG. 3 shows the system of FIG. 1 during exemplary performance of block 205 from the method of FIG. 2.

Block 205 comprises receiving a data record representing a traded value. In system 50, block 205 is performed by quotation engine 58 which receives a data record Data Record DR-0 containing electronic data representing a market value weighted price, yield, total volume traded, trade date, and settlement date, for a given bond issue. Block 205 is represented in FIG. 3, where traded-value data record Data Record DR-0 is sent from clearing server 66 to quotation engine 58. Once received, data record Data Record DR-0 is stored in memory at quotation engine 58. As part of block 205, quotation engine 58 can be configured to apply corrections to data within data record Data Record DR-0 that is known to be incorrect. A correction factor may be ascertained based on the data within data record Data Record DR-0. For example, if the price within data record Data Record DR-0 is determined to be incorrect, it may be calculated based on the remaining data within data record Data Record DR-0, if such data is correct. A further example of a correction factor involves examining trades, that have been booked on clearing server 66 with a price that includes the interest that has accrued but which has not been paid ("Accrued Interest"). (The normal expectation is that trades have been booked clean, i.e. without Accrued Interest in the final price). Quotation engine 58 can be configured to also utilize known previous terms and conditions in a database that is configured to provide a correction factor that recalculates the correct clean price by reversing out the Accrued Interest given the price date and settlement date from the clearing system feed. Where such corrections cannot be applied, because a correction factor is unknown or unascertainable, then data record Data Record DR-0 is identified as being incorrect and method 200 is halted, in favour of performing another process, such as method 200a or 200b instead. (Method 200a and method 200b will be discussed further below). In some embodiments, quotation engine 58 may request that clearing server 66 send another copy of data record Data Record DR-0, for example if it is determined that the previously received copy of data record Data Record DR-0 was corrupted.

Note that method 200 can be performed at any time, but is typically performed within one half-hour after traded values for a given bond issue have been stored in a data record (such as data record Data Record DR-0) on clearing server 66. Note that the half-hour time period is not fixed and is a non-limiting example. Generally, method 200 is commenced at a time that is substantially immediately after traded values for a given bond issue have been stored in a data record on clearing server 66 and are therefore available to quotation engine 58. Method 200 may also be performed at other times, however. In some embodiments, method 200 may commence at any time during the period beginning substantially immediately after traded values for a given bond issue have been stored in a data record such as data record DR-0 on clearing server 66, and ending substantially immediately before the expiry of the traded values for the given bond issue. Generally, traded values for a given bond issue expire at the start of the following trading period—typically, the following business day—such that traded values for a given trading period are used in the performance of method 200 during the present trading period only. However, it will be appreciated by those skilled in the art that expiry times for traded values may be varied as desired according to the context of the particular bond market. Also note that method 200 can be performed for multiple bond issues, either as parallel processes within quotation engine 58, or serially or via a combination of serial and parallel processes.

Also note that, in certain embodiments, quotation engine 58 is configured, as part of block 205, to normalize traded values for certain bonds within data record Data Record DR-0, in order to reduce or eliminate erroneous data and omit incorrectly booked trades. This variation is discussed further below.

Figure 4:
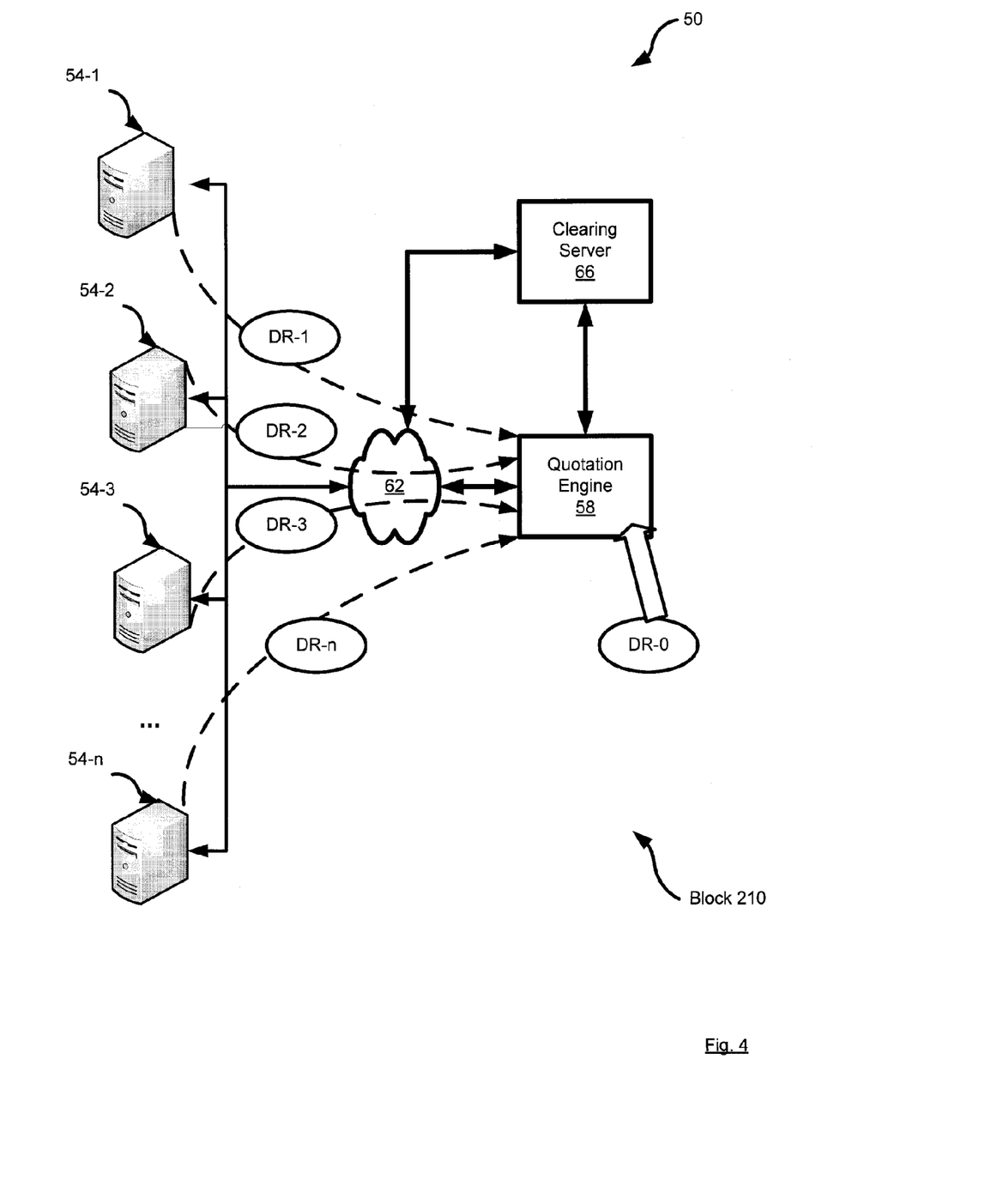
FIG. 4 shows the system of FIG. 1 during exemplary performance of block 210 from the method of FIG. 2.

Block 210 comprises receiving quotes from trading firms or dealers. In system 50, block 210 is performed by quotation engine 58 which receives data records Data Record DR-1, Data Record DR-2, . . . Data Record DR-n containing electronic data representing quotes for a given bond issue from each respective quotation server 54. Block 205 is represented in FIG. 4, where quotation data records Data Record DR-1 . . . Data Record DR-n are sent from quotation servers 54 to quotation engine 58.

In a present embodiment data records Data Record DR-1 . . . Data Record DR-n are sent directly from quotation servers 54 to quotation engine 58. However, in a typical variant on this embodiment, data records Data Record DR-1 . . . Data Record DR-n are posted by their respective quotation servers 54 at different times to a quotation server database (not shown). In turn, data records Data Record DR-1 . . . Data Record DR-n are then retrieved from the quotation server database (not shown) during performance of block 210.

Because of the heterogeneous nature of each quotation server 54, data records Data Record DR-1 . . . Data Record DR-n are typically in heterogeneous formats. Thus, as part of block 210 quotation engine 58 can be configured to standardize data records Data Record DR-1 . . . Data Record DR-n into a common format. Furthermore, as part of block 210, quotation engine 58 can be configured to apply corrections to data within each data record Data Record DR-1 . . . Data Record DR-n that is known to be incorrect and where a known correction factor can be applied. A correction factor may be ascertained based on the data within each Data Record DR-1 . . . DR-n, for example by re-calculating a portion of the data known to be incorrect within a data record based on the remaining data within the data record, if such remaining data is correct. Where such corrections cannot be applied, because a correction factor is unknown or unascertainable, then any data record Data Record DR-1 . . . Data Record DR-n that is identified as being incorrect is omitted from further processing using method 200.

Block 215 comprises deleting data records from block 210 that contain quotes that exceed a first predefined threshold of the traded value within the data record from block 205. (Note that the term "delete" as used in this block and subsequent blocks can refer to completely deleting from the storage of quotation engine 58, or can refer to deleting them within a block of storage that is dedicated to method 200, or to flagging them as "ignore" during subsequent processing of method 200). In the present embodiment, the first predefined threshold value is referred to as X %. The inventor determined that computing resources amongst servers 54 and engine 58 are efficiently utilized when X is within certain ranges. The inventor determined that X can be determined by reviewing the variance of each individual bond issue that is priced utilizing an historical analysis over a specific time period. A three month time period has been determined to be a suitable specific time period, although it will be appreciated that other time periods may also be used and are intended to fall within the scope of the specification. Alternatively, X can be determined by reviewing the daily variance in pricing for the entire period of the issue's existence where the issue has less than three months of pricing history. Using these techniques, the inventor determined that a first range for the value of X can be between about minus four and about plus four. Using these techniques, the inventor determined that a second range for the value of X can be between about minus twenty-five and about plus twenty-five. The inventor has also determined that additional ranges for X can be set between the first range and the second range, and that the ranges need not be equally negative and positive. These ranges have been determined to lead to good utilization of computing resources of servers 54 and engine 58.

Block 220 comprises comparing the quotes within the data records that survived the deletions from block 215. Block 225 comprises deleting data records from block 220 that exceed a second predefined threshold in relation to each other. In the present embodiment, the second predefined threshold value is referred to as Y %. The inventor determined that computing resources amongst servers 54 and engine 58 are efficiently utilized when Y is within certain ranges. The inventor determined that Y can be determined by examining historical data according to the type of bond issue. Reviewing the daily variance in pricing history for a given type of bond issue over a two-year time period has been determined to be suitable for this purpose, though it will be appreciated that other time periods may also be used. Using these techniques, the inventor determined a first range for the value of Y can be between about minus 0.750 and about plus 0.750. Using these techniques, the inventor also determined that a second range for the value of Y can be between about minus 1.750 and about plus 1.750. The inventor has also determined that additional ranges can be set for Y between the first range and the second range, but those ranges are typically equally negative and positive. These ranges have been determined to lead to good utilization of computing resources of servers 54 and engine 58.

Block 230 comprises performing a mean and standard deviation operation on the quotes stored in the data records that survived deletion at block 225. Block 235 comprises deleting firm quotes from block 230 that exceed a third predefined threshold of the standard deviation operation from block 225. In the present embodiment, the third predefined threshold value is referred to as Z %. The inventor determined that a range for the value of Z of between about minus one and plus one leads to good utilization of the computing resources of servers 54 and engine 58. The election to utilize one standard deviation from the mean was based on the fact that for data that is "normally distributed" it is expect that about 68.27% of the data will be within one standard deviation of the mean. One standard deviation from mean is recognized in the art as a common standard used that still provides a reasonable data set in relation to the mean for this purpose.

Block 240 comprises determining if any of the firm quotes survived the deletion from block 235. If a "no" determination is made at block 240, then at block 250 an exception handling routine is invoked at engine 58. Such an exception handling routine 58 can comprise performing any desired alternative process for determining a final price for the particular bond issue, or an error message indicating that final price for the particular bond issue was not ascertainable. For example, a final price may be set as the average of prices within surviving data records from an earlier block, such as block 215. As another example method 200a or method 200b, discussed further below, may be invoked. If a "yes" determination is made at block 240, then at block 245 a final price is determined using the quotes stored in the data records that survived deletion block 235. In a present embodiment the final price for the bond issue is calculated by determining the mean of the quotes stored in the data records that survived deletion at block 235. The final price determined at block 245 is generated. In a present embodiment the final price is incorporated into a data record DRn+1.

Block 255 comprises generating one or more output data records for subsequent processing. Engine 58 can be configured at block 255 to return data record DRn+1 to a portion of, or all of the quotation servers 54. In a present embodiment, engine 58 is configured to return data record DRn+1 only to quotations servers 54 that submitted data records at block 210 that survived deletion at block 225. This configuration is designed to further improve efficient use of quotation servers 54 and engine 58 to discourage repeated submission (on subsequent performances of method 200) from the same quotation servers 54 of data records at block 210. (Note that since servers 54 and engine 58 may cooperate via method 200 for multiple bond issues, it is contemplated that a given server 54 may be properly participating in method 200 for certain bond issues, but presenting inaccurate data records for method 200 for other bond issues).

Figure 5:
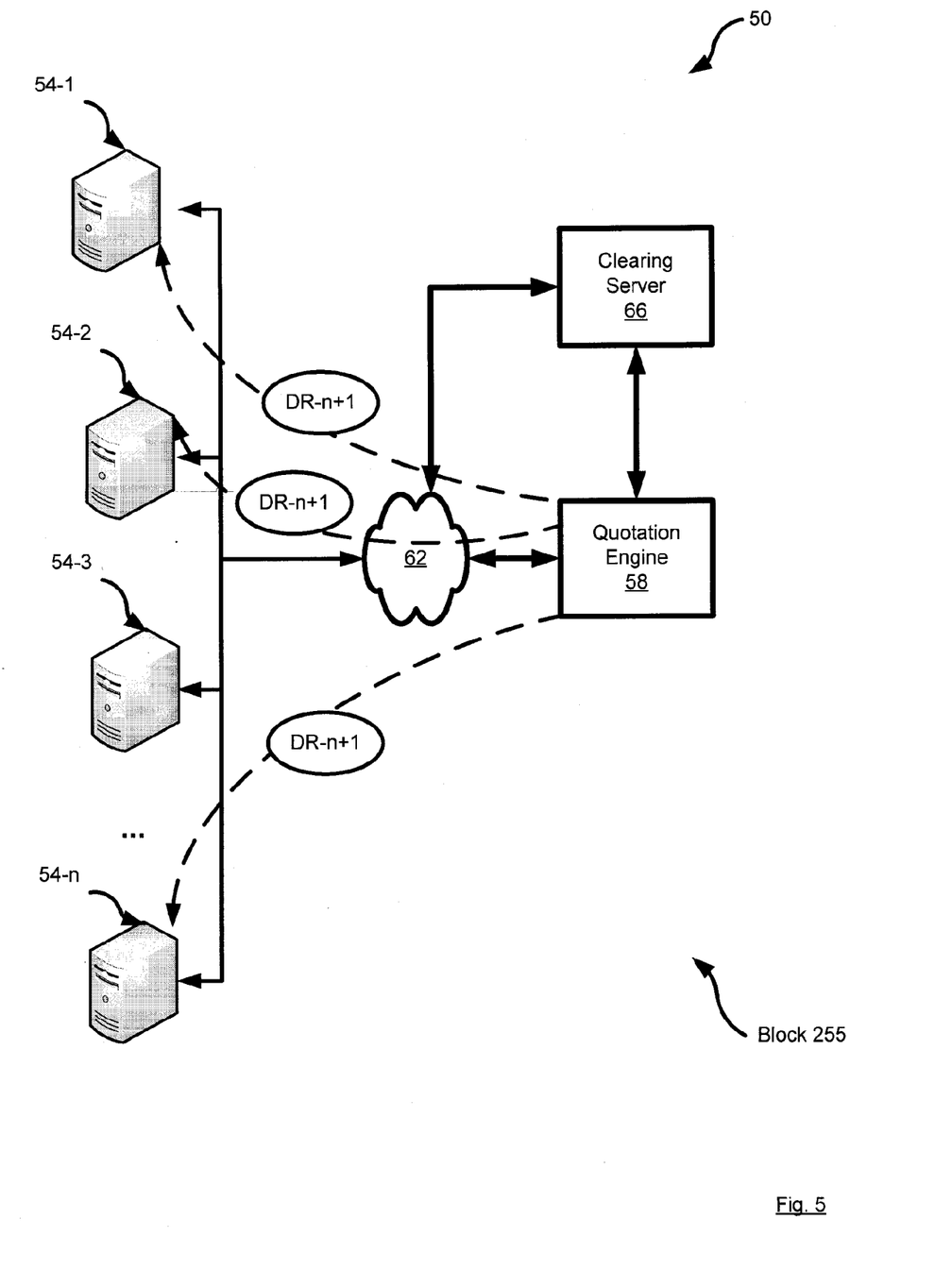
FIG. 5 shows the system of FIG. 1 during exemplary performance of block 255 from the method of FIG. 2.
Figure 6:
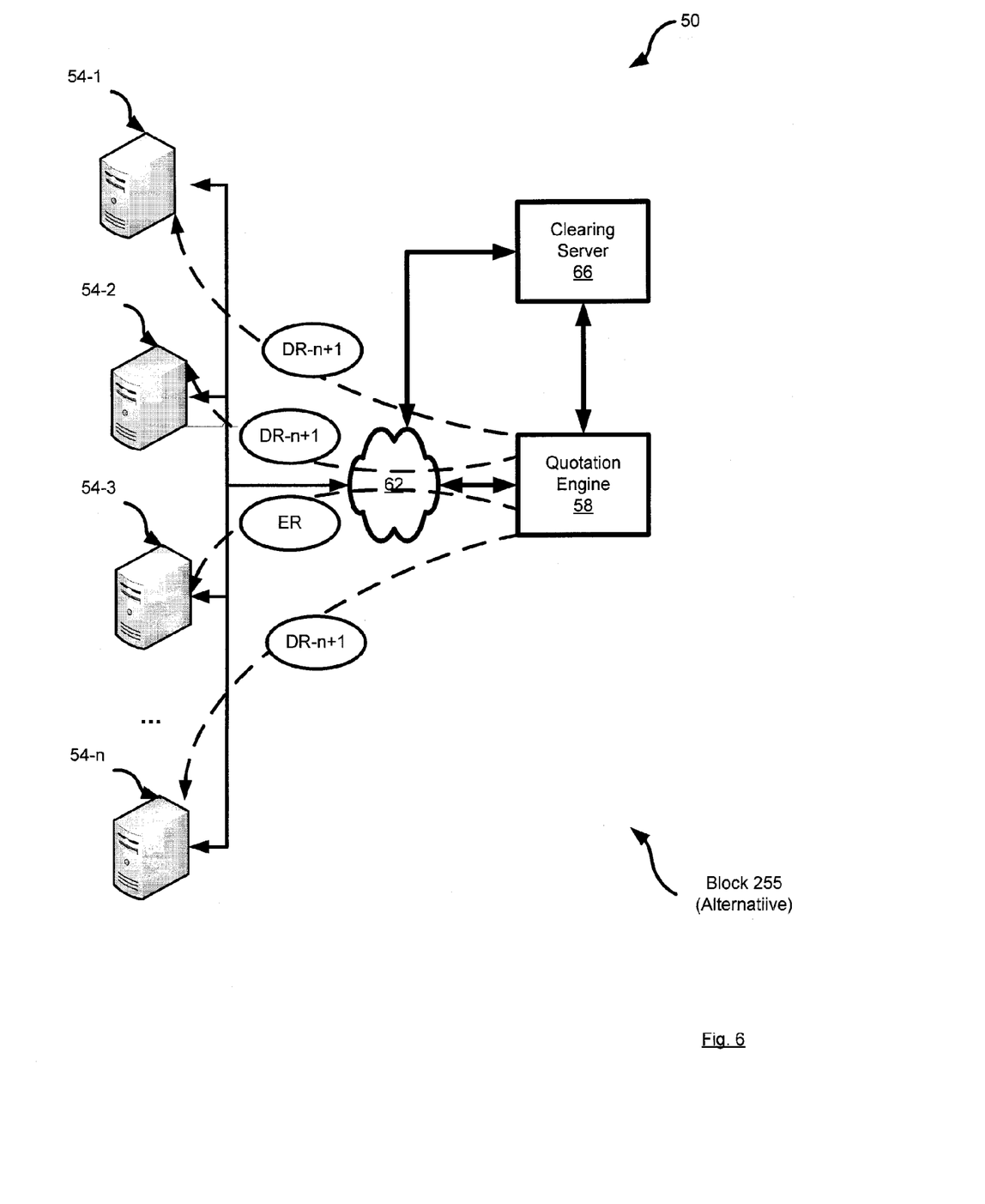
FIG. 6 shows the system of FIG. 1 during exemplary alternative performance of block 255 from the method of FIG. 2.

In a present embodiment block 255 comprises returning data record DRn+1 to at least a portion of the quotation servers 54. Exemplary performance of block 255 is represented in FIG. 5 as a data record DRn+1, which contains the final price of the bond issue as determined at block 240, and which is returned to quotation servers 54-1, 54-2 and 54-n, but is not returned to quotation server 54-3, which takes into the account the example that quotation server 54-3 had submitted data record DR-3 which did not survive deletion at block 225. FIG. 6 shows an alternative to the performance of block 255 shown in FIG. 5, wherein in addition to returning data record DRn+1 to quotation servers 54-1, 54-2 and 54-n, an exception report ER is also sent to quotation server 54-3 indicating to quotation server 54-3 that data record DR-3 did not survive deletion at block 225. Exception report ER can then be used by quotation server 54-3 to update processes within quotation server 54-3 so that erroneous data records for that bond issue are not sent again, and thereby further reduce processing resource wastage on engine 58.

The returned data to quotation servers 54 can then be fed back into automated trading processes (either hosted on server 54 itself or another server) that automatically lead to electronic instructions representing orders to buy or sell that particular bond. By relieving processing stresses on each quotation server 54, computing resources can be directed to the automated trading processes and thereby reduce latency associated with such automated trading processes.

Figure 7:
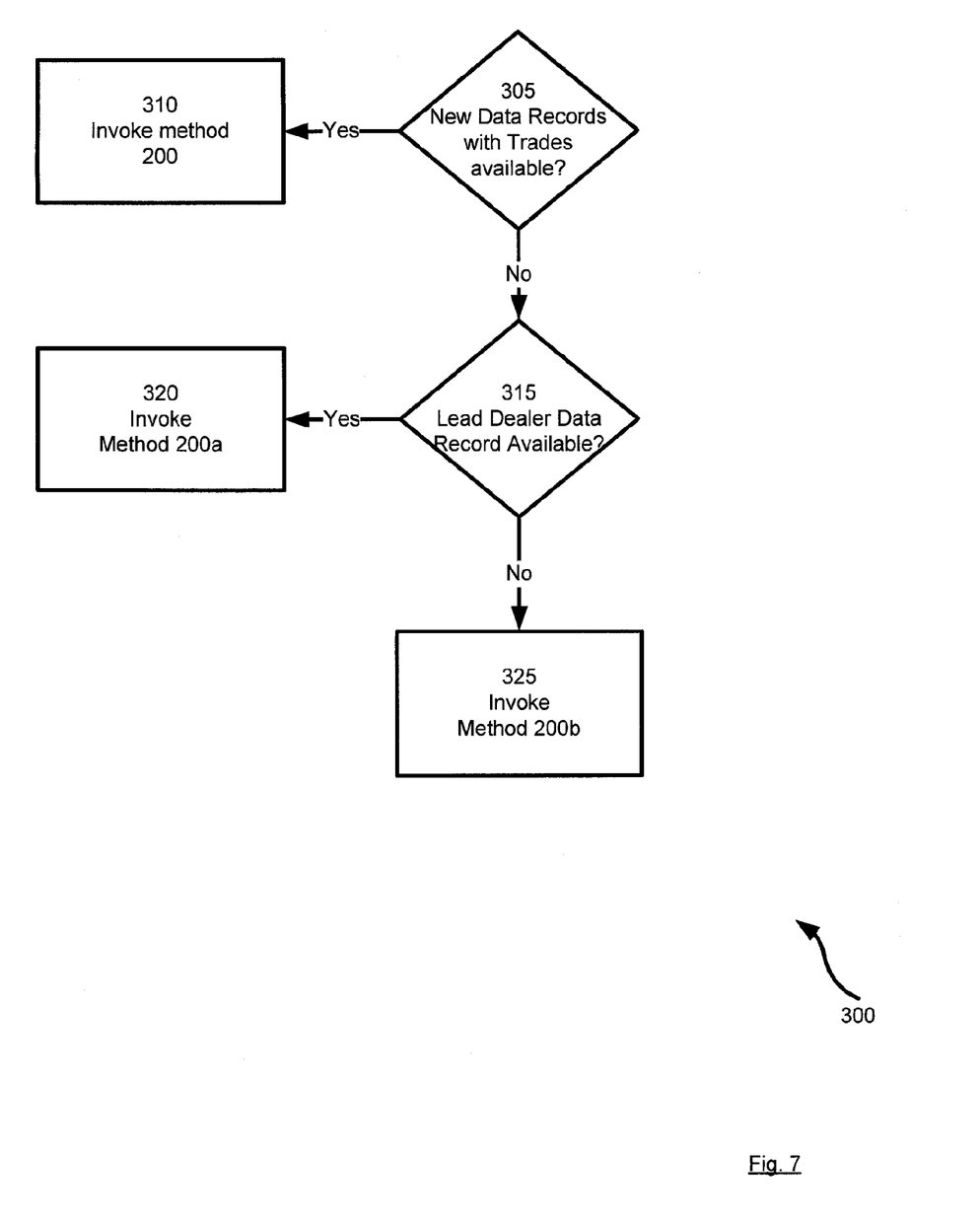
FIG. 7 shows a method for pooling computing server resources in accordance with another embodiment.

Referring now to FIG. 7, a method for pooling computing resources in accordance with another embodiment of the invention is represented as a flow-chart and indicated generally at 300. In order to assist in the explanation of the method, it will be assumed that method 300 is performed using system 50. Furthermore, the following discussion of method 300 will lead to further understanding of system 50 and its various components. However, it is to be understood that system 50 and/or method 300 can be varied, and need not work exactly as discussed herein in conjunction with each other, and that such variations are within the scope of the present invention.

Block 305 comprises determining if new data records that store actual trades are available. The type of data records contemplated at block 305 is the same type of data records (i.e. those stored or made available from clearing server 66) as contemplated at block 205 of method 200. "New" means data records that have changed or added since the most recent performance of method 200. A "yes" determination is reached at block 305 if new data records that store actual trades are available since the most recent performance of method 200, in which case block 310 is reached, at which point method 200 is invoked as before. A "no" determination is reached if new data records that store actual trades are not available, in which case block 315 is reached.

Block 315 comprises determining if lead dealer data records are available. A "yes" is satisfied at this block if a data record containing a quote for a particular bond issue is available from the one of the quotation servers 54 that is respective to the dealer that actually initially issued the particular bond (i.e., the "lead dealer") in relation to which method 300 is being performed. Thus, in order to effect block 315, quotation engine 58 is configured to maintain a database that identifies which quotation server 54 is respective to the lead dealer for each bond issue that is processed by quotation engine 54. This database is used to perform block 315.

A "yes" determination is therefore reached at block 315 if a data record containing a quote for a particular bond issue is available from the one of the quotation servers 54 that is respective to the lead dealer, in which case block 320 is reached, at which point a method 200a is invoked. Method 200a is discussed further below. Where a "no" determination is made at block 315, block 325 is reached, at which point a method 200b is invoked. Method 200b is discussed further below.

Figure 8:
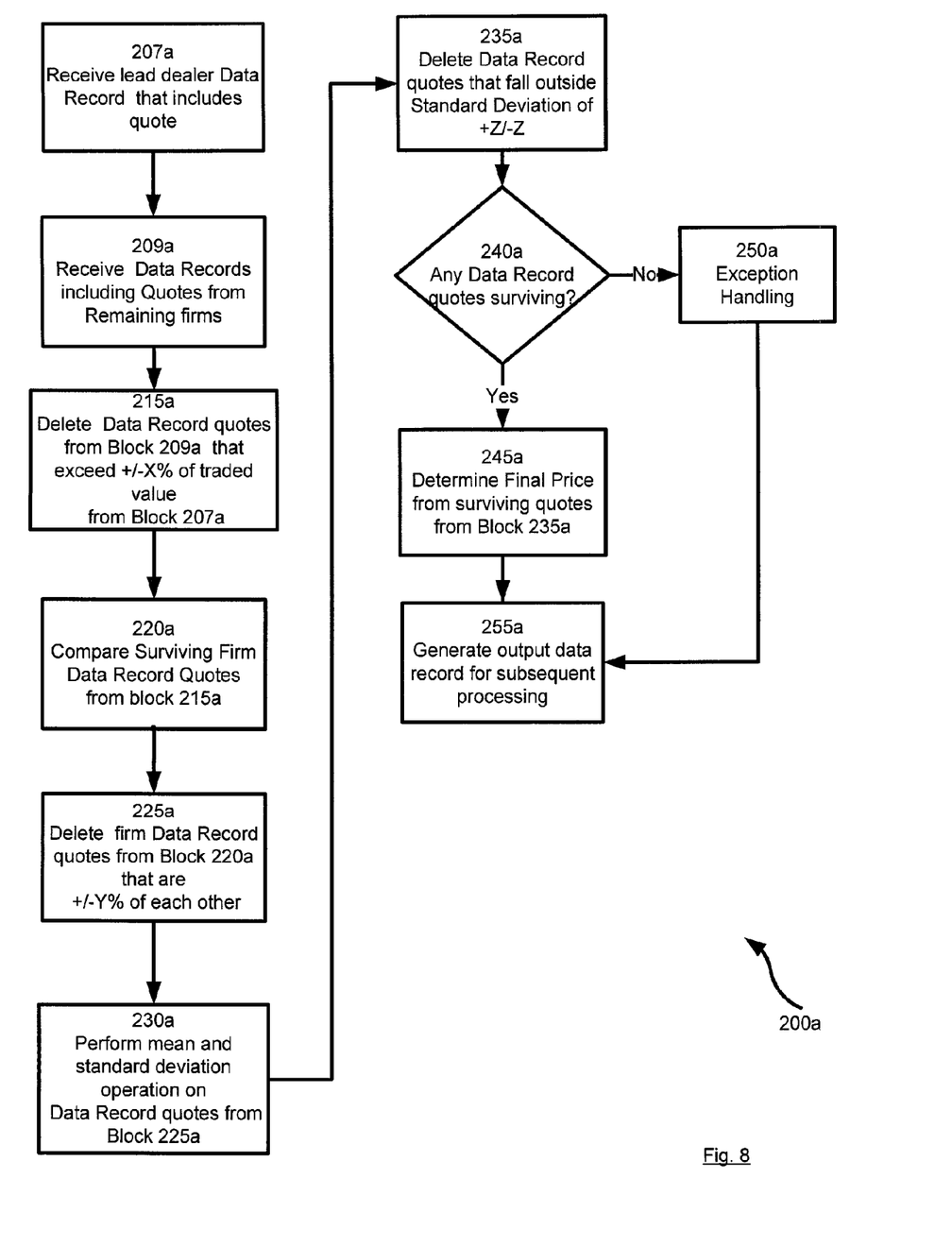
FIG. 8 shows a flow-chart depicting a method for pooling computing server resources in accordance with another embodiment.

Method 200a is illustrated as a flow-chart in FIG. 8. Method 200a is a variant on method 200 and thus like blocks bear like references except in method 200a references are followed by the suffix "a". Of note is that in method 200a, block 205 is omitted and replaced with block 207a. Block 207a comprises receiving a data record from a quotation server respective to the lead dealer that includes a quote for the bond issue. Also of note is that block 210 is omitted and replaced with block 209a. Block 209a comprises receiving data records from the remaining quotation servers 54 (i.e. all quotation servers 54 except for the quotation server 54 from block 207a) respective to dealers other than the lead dealer's quotation server. The data records at block 209a containing a quote for the bond issue respective to those quotation servers 54. Otherwise, method 200a performs substantially the in same manner as method 200, though with appropriate adjustment according to the context of the data received at blocks 207a and 209a.

Figure 9:
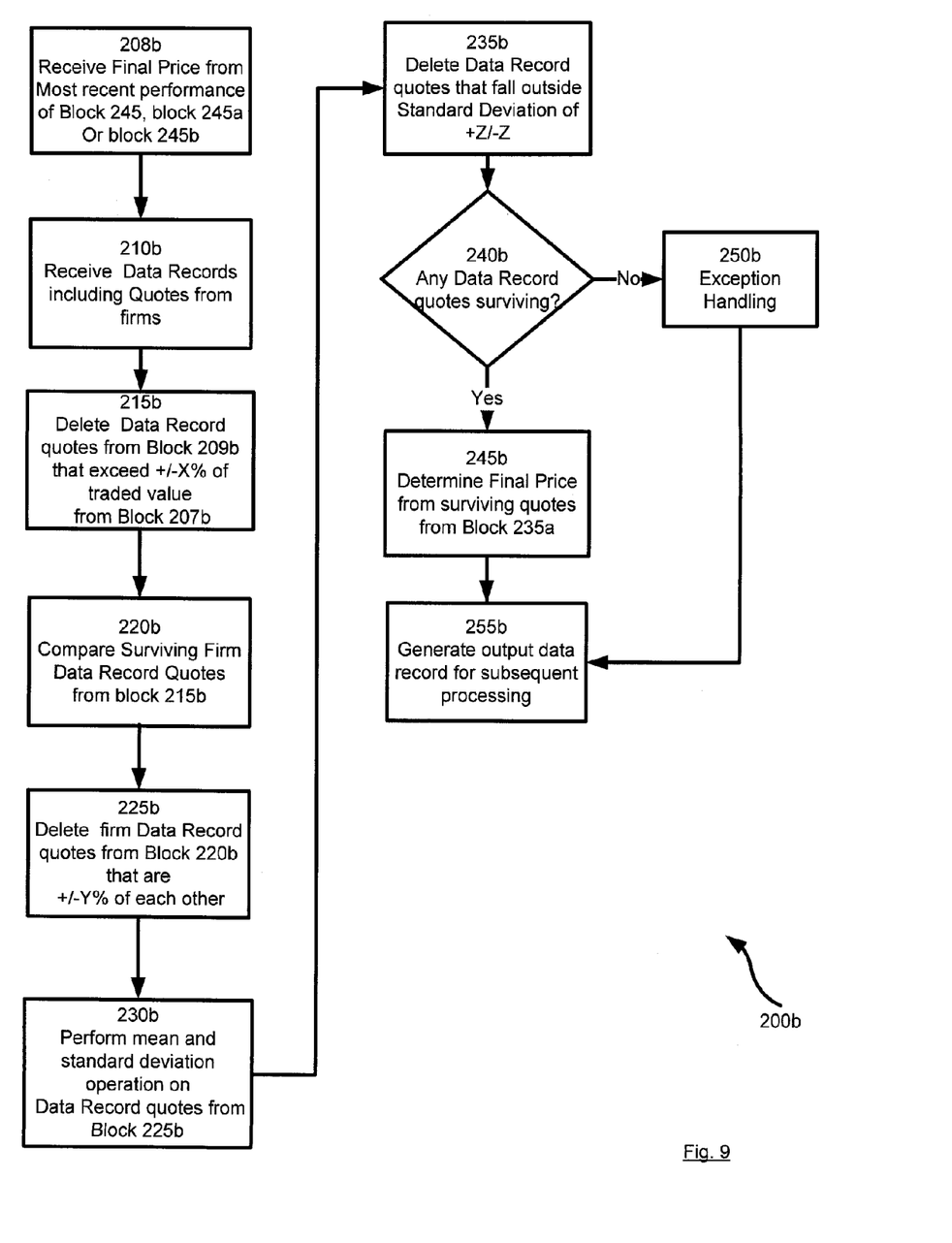
FIG. 9 shows a flow-chart depicting a method for pooling computing server resources in accordance with another embodiment.

Method 200b is illustrated in flow-chart in FIG. 9. Method 200b is a variant on method 200 and thus like blocks bear like references except in method 200b references are followed by the suffix "b". Of note is that in method 200b, block 205 is omitted and replaced with block 208b. Block 208b comprises determining whether method 200, method 200a or method 200b had been performed most recently, and receiving the final price from block 245, block 245a or block 245b depending on which of those three blocks had been performed most recently. Otherwise, method 200b performs substantially the in same manner as method 200, though with appropriate adjustment according to the context of the data received at block 200b.

While the foregoing describes certain embodiments and examples, it should be understood that these are non-limiting, and that variations, subsets, and combinations are within the scope of the invention. For example, as described above in relation to in system 50, block 205 was performed by quotation engine 58 which receives a data record representing a market value weighted price, yield, total volume traded, trade date, and settlement date, for a given bond issue. However, as noted above, quotation engine 58 is configured, as part of block 205, to receive a plurality of traded values for a given bond issue as part of data record Data Record DR-0, and to assess and correct those traded values where necessary, in order to reduce or eliminate erroneous data and omit incorrectly booked trades. In this variation Quotation engine 58 is configured to reverse engineer the data stored within data record Data Record DR-0 to determine such a normalized price. Such a normalized price reflects the price at which the trade actually occurred, rather than a non-normalized price which may be actually stored within data record Data Record DR-0, and which reflects the actual price of the bond plus accrued value of the bond, as provided by clearing server 66. Quotation engine 58 is also configured to omit bond trade values in data record Data Record DR-0 that reflect repurchase agreements that have been incorrectly stored in data record Data Record DR-0 as client trades. The surviving, corrected actual trade values within data record Data Record DR-0 are aggregated to provide a market value weighted price, yield and total volume traded for each issue. In some embodiments, for example where pricing is to be determining for institutional bond trading, trades having less than about 500,000 face value are also omitted by quotation engine 58. It will be appreciated by those skilled in the art, however, that smaller trades may also be used in other embodiments.

The inventor has conducted tests using the foregoing. Results of certain of those tests in relation to performances of various methods are discussed below. A first test was run with a first bond referred to herein as Bond 1 using method 200, as discussed below.

Number refers to a number assigned in Table I-1 for convenience in this specification for ease of reference of to this particular example. Issue Name refers to the legal entity (e.g. Corporation, government) that issued the bond. CUSIP means Committee on Uniform Security Identification Procedures and is a unique identifier used in the securities industry used to uniquely identify a particular bond. Coupon refers to the interest rate associated with the corresponding CUSIP identifier. Maturity Date refers to the date on which the bond is redeemable, and effective maturity date refers to the measure of a bond's maturity which takes into consideration the possibility that the issuer may call the bond before its maturity date. Traded Date refers to the date of the trade. In this example the date of Oct. 20, 2008 is given, and thus a suitable time for method 200 to have been performed is on Oct. 20, 2008 shortly after the data in Table I-1 became available. Traded Amount indicates the volume of the trade. Trades indicates the number of trades that were required to effect the traded amount. Traded Price indicates the actual traded price as discussed above in relation to block 205, and which is extracted from data record DR-0 for use in subsequent steps of method 200. Original price indicates the closing price for the last previous business day held in the database (as built by this model on the previous business day). Previous/CDS Price indicates the most recent previous traded price for this bond issue as obtained from a clearing server 66 maintained, for example, by a clearing house entity such as Clearing and Depository Services Inc. (CDS) in Canada.

TABLE I-1

Exemplary Data Record DR-0
Block 205 of Method 200

| Bond Number | Issue Name | CUSIP (Identifier) | Coupon | Maturity Date | Effective Maturity Date | Traded Date | Traded Amount | Trades | Traded Price | Orig Price | Prev/CDS Price |
|---|---|---|---|---|---|---|---|---|---|---|---|
| Bond 1 | Telus Corp. | 87971MAG8 | 4.95 | Mar. 15, 2017 | Mar. 15, 2017 | Oct. 20, 2008 | 70000 | 1.00 | 81.25 | 89.61 | 81.25 |

Table I-1 shows an exemplary data record DR-0 that can be received at block 205. The bottom row in Table I-1 represents a single performance of method 200. In Table I-1, Bond

TABLE II-1

Quoted Price Portion of Data Records for Bonds
Block 210 of Method 200

| Bond Number | Server 54-1 Data Record DR-1 | Server 54-2 Data Record DR-2 | Server 54-3 Data Record DR-3 | Server 54-4 Data Record DR-4 | Server 54-5 Data Record DR-5 | Server 54-6 Data Record DR-6 | Server 54-7 Data Record DR-7 | Server 54-8 Data Record DR-8 | Server 54-9 Data Record DR-9 | Server 54-10 Data Record DR-10 | Server 54-11 Data Record DR-11 |
|---|---|---|---|---|---|---|---|---|---|---|---|
| Bond 1 | 88.79 | 90.17 | 89.59 | 77.54 | 92.66 | 86.07121 | 88.08 | 90.04 | 81.90 | 89.81 | 93.84 |

Table II-1 shows the quoted price portion of data records DR-1 ... DR-11 received from eleven quotation servers 54 (i.e. where n=11) as part of performance of block 210. Thus each cell in Table II-1 reflects a quoted price in the form of raw data as discussed above in relation to block 210. The data has already undergone relevant assessment and correction operations as discussed above.

TABLE III-1

Data Records Surviving Deletion
Block 215

| Bond Number | Server 54-1 Data Record DR-1 | Server 54-2 Data Record DR-2 | Server 54-3 Data Record DR-3 | Server 54-4 Data Record DR-4 | Server 54-5 Data Record DR-5 | Server 54-6 Data Record DR-6 | Server 54-7 Data Record DR-7 | Server 54-8 Data Record DR-8 | Server 54-9 Data Record DR-9 | Server 54-10 Data Record DR-10 | Server 54-11 Data Record DR-11 |
|---|---|---|---|---|---|---|---|---|---|---|---|
| Bond 1 | Deleted | Deleted | Deleted | 77.54 | Deleted | Deleted | Deleted | Deleted | 81.90 | Deleted | Deleted |

Table III-1 shows the results of performance of block 215 using Table I-1 and Table II-1. In this performance, X was set to provide a range of plus four percent and minus six percent. Note that only data records DR-4 and DR-9 have survived the performance of block 215. Subsequent performance of the remainder of method 200 now consumes fewer processing resources on server 58 with the deletion of the other data records.

A second test was run with a second bond referred to herein as Bond 2 using method 200b, the results of which are discussed below.

TABLE I-2

Exemplary Data Record DR-0
Block 208b of Method 200b

| Bond Number | Issue Name | CUSIP (Identifier) | Coupon | Maturity Date | Effective Maturity Date | Traded Date | Traded Amount | Trades | Traded Price | Orig Price | Prev/CDS Price |
|---|---|---|---|---|---|---|---|---|---|---|---|
| Bond 2 | Telus Corp. | 87971MAH6 | 5.95 | Apr. 15, 2015 | Apr. 15, 2015 | N/A | N/A | N/A | N/A | 99.53 | 99.53 |

Table I-2 shows an exemplary data record DR-0 that can be received at block 208b. The format of data record DR-0 in Table I-2 is substantially the same as the format of Table I-1. Of note is that there have been no prior trades, and there is no lead dealer, and thus as part of performance of method 300 analyzing data record DR-0, method 200b is invoked. Thus the bottom row in Table I-2 represents a single performance of method 200b. Of note is that traded date, traded amount, trades, and traded price all indicate N/A, as no trades have been effected, and thus the value of 99.53 is extracted from the "Prev/CS Price Field" for use at block 215b.

TABLE II-2

Quoted Price Portion of Data Records for Bonds - Raw Data
Block 210b of Method 200b

| Bond Number | Server 54-1 Data Record DR-1 | Server 54-2 Data Record DR-2 | Server 54-3 Data Record DR-3 | Server 54-4 Data Record DR-4 | Server 54-5 Data Record DR-5 | Server 54-6 Data Record DR-6 | Server 54-7 Data Record DR-7 | Server 54-8 Data Record DR-8 | Server 54-9 Data Record DR-9 | Server 54-10 Data Record DR-10 | Server 54-11 Data Record DR-11 |
|---|---|---|---|---|---|---|---|---|---|---|---|
| Bond 2 | 99.34 | 101.71 | 98.30 | 91.75 | Not submitted | 95.93065 | 92.94 | 100.01 | 92.65 | 99.54 | 97.36 |

Table II-2 shows the quoted price portion of data records DR-1 . . . DR-11 received from eleven quotation servers 54 (i.e. where n=11) as part of performance of block 210. Thus each cell in Table II reflects a quoted price in the form of raw data as discussed above in relation to block 210. The data has already undergone any relevant assessment and correction operations discussed above. Note that not all servers 54 need actually submit a data record DR for every bond issue, and hence nothing has been received from server 54-5.

TABLE III-2

| | \multicolumn{11}{c}{Data Records Surviving Deletion Block 215b} |
|---|---|---|---|---|---|---|---|---|---|---|---|
| Bond Number | Server 54-1 Data Record DR-1 | Server 54-2 Data Record DR-2 | Server 54-3 Data Record DR-3 | Server 54-4 Data Record DR-4 | Server 54-5 Data Record DR-5 | Server 54-6 Data Record DR-6 | Server 54-7 Data Record DR-7 | Server 54-8 Data Record DR-8 | Server 54-9 Data Record DR-9 | Server 54-10 Data Record DR-10 | Server 54-11 Data Record DR-11 |
| Bond 2 | 99.34 | 101.71 | 98.30 | Deleted | Not submitted | 95.93 | Deleted | 100.01 | Deleted | 99.54 | 97.36 |

Table III-2 shows the results of performance of block 215*b* using Table I-2 and Table II-2. In this performance X was set to plus or minus six percent. Note that only data records DR-1, DR-2, DR-3, DR-6, DR-8, DR-10, and DR-11 survived the performance of block 215*b*. Subsequent performance of the remainder of method 200*b* now consumes fewere processing resources on server 58 with the deletion of the other data records DR.

TABLE IV-2

| | \multicolumn{11}{c}{Data Records Surviving Deletion Block 225b} |
|---|---|---|---|---|---|---|---|---|---|---|---|
| Bond Number | Server 54-1 Data Record DR-1 | Server 54-2 Data Record DR-2 | Server 54-3 Data Record DR-3 | Server 54-4 Data Record DR-4 | Server 54-5 Data Record DR-5 | Server 54-6 Data Record DR-6 | Server 54-7 Data Record DR-7 | Server 54-8 Data Record DR-8 | Server 54-9 Data Record DR-9 | Server 54-10 Data Record DR-10 | Server 54-11 Data Record DR-11 |
| Bond 2 | 99.34 | 101.71 | 98.30 | Deleted | Not submitted | 95.93 | Deleted | 100.01 | Deleted | 99.54 | 97.36 |

Table IV-2 shows the results of performance of block 225*b* using Table III-2. In this performance Y was set to two percent. Note that all of the data records from block 215*b* survived the performance of block 225*b*, in that no records in this example were deleted as a result of block 225*b*.

TABLE V-2

| | \multicolumn{11}{c}{Data Records Surviving Deletion Block 235b} |
|---|---|---|---|---|---|---|---|---|---|---|---|
| Bond Number | Server 54-1 Data Record DR-1 | Server 54-2 Data Record DR-2 | Server 54-3 Data Record DR-3 | Server 54-4 Data Record DR-4 | Server 54-5 Data Record DR-5 | Server 54-6 Data Record DR-6 | Server 54-7 Data Record DR-7 | Server 54-8 Data Record DR-8 | Server 54-9 Data Record DR-9 | Server 54-10 Data Record DR-10 | Server 54-11 Data Record DR-11 |
| Bond 2 | 99.34 | Deleted | 98.30 | Deleted | Not submitted | Deleted | Deleted | Deleted | Deleted | 99.54 | Deleted |

Table V-2 shows the results of performance of block 235*b* using Table IV-2. In this performance Z was set to one. Note that only data records DR-1, DR-3 and DR-10 survived the performance of block 235*b*.

TABLE VI-2

Final Price Determination - Data Record DRn + 1
Block 245b

| | Final Bid Price Mean | Final Count | Price Ask | Yield Bid | Yield Ask |
|---|---|---|---|---|---|
| Bond 2 | 99.060112 | 3.00 | 99.795623 | 6.127557 | 5.988268 |

Table VI-2 shows the results of performance of block 245b using Table V-2, to create data record DRn+1. "Final Bid Price Mean" reflects the final price calculation as discussed above in relation to block 245 which is also applicable to block 245b. This column entry alone satisfies performance of block 245, however the other columns in Table VI-2 can also be provided as part of bock 255.

Final Count in Table VI-2 reflects the number of data records upon which the determination of final price was made—in this case, data records DR-1, DR-3 and DR-10.

Price Ask in Table VI-2 reflects a determined price that purchasers are currently paying for the particular bond. Price Ask can be determined using method 400 shown in FIG. 10. Method 400 can be performed in conjunction with method 200 (or its variants method 200a and method 200b). Block 405 comprises receiving a bid-and-ask price spread from each quotation engine 54. Each bid-and-ask price spread corresponds with the bond that is part of the quote received at block 210 (or its variants). The bid-and-ask price spread is the difference between the bid-price and the ask-price of the relevant bond. The bid-price refers to the bid price (i.e. the price that would be paid by the provider of the quote in purchasing the relevant bond) that the particular dealer maintained on quotation server 54 in relation to the relevant bond. The ask-price refers to the asking price (i.e. the price that would be paid to the provider of the quote in selling the relevant bond) that the particular dealer maintained on quotation server 54 in relation to the relevant bond. The bid-and-ask price can be received as part of performing block 210 (or its variants).

Figure 10:
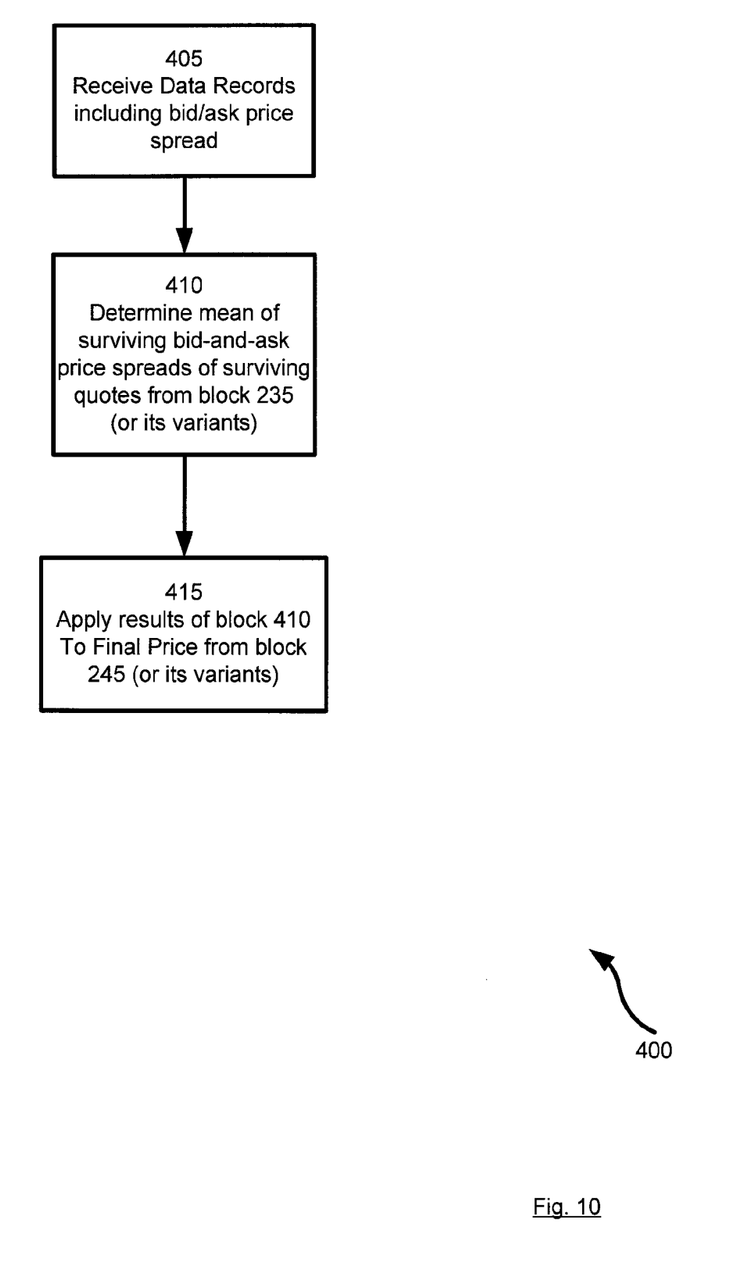
FIG. 10 shows a flow-chart depicting a method for determining a Price Ask as part of optional output generation from other methods discussed herein.

Block 410 comprises determining the mean of the bid-ask-price spread from the data records that survived deletion from block 235 (or its variants).

Block 415 comprises applying the results of block 410 to the Final Bid Price Mean from block 245. Applying can involved adding the mean of the bid-ask-price spread determined at block 410 to the Final Bid Price Mean from block 245.

Yield Bid reflects the determined rate of return for the particular bond when purchased at the bid price (indicated in the Final Price Bid Mean column of Table VI-2). Yield Ask Reflects the determined rate of return for the particular bond when purchased at the ask price (indicated in the Price Ask column of Table VI-2).

The values of Final Price Bid Mean, Price Ask, Yield Bid and Yield Ask above are calculated in conjunction with a terms and conditions database containing information for each active bond issue. The information contained in the terms and conditions database may include CUSIP, coupon rates, first payment dates, issue dates, amortizing and prepayment schedules, penalty payments, call dates, ratings, industry assignments and the like.

The foregoing examples are non-exhaustive of possible performances of methods 200, 200a and 200b but are intended to be illustrative.

The present invention provides a novel system and method for pooling computing resources in that: processing resources on engine 58 are used more efficiently as certain data records are at least ignored, processing resources on servers 54 are more efficiently used as servers 54 can focus on other processing tasks while quotation determination is performed on engine 58 rather than using each server 54 to analyze quotation data from all other servers 54; where records are completely deleted from volatile or non-volatile storage or both during performance of method 200 then the storage resources on engine 58 are more efficiently utilized; storage resources of servers 54 are more efficiently utilized as each server need not maintain copies of quotations from each other server 54. Additionally, the systems and methods provided herein allow for more efficient use of computing resources on servers 54 and quotation engine 58 due to the increased accuracy and reliability of the determined pricing, which in turn does not require additional verification or recalculation.

While the foregoing has focused on bonds, it will be understood that other negotiable instruments (e.g. stocks, futures, commodities) are also intended to be within the scope of the invention. The scope of the present invention is not intended to be restricted by the foregoing but is instead defined by the claims attached hereto.

The invention claimed is:

1. A system for pooling computing server resources comprising:
    a plurality of quotation servers; each of said quotation servers configured to maintain a dealer data record comprising a price and yield quotation for a bond; at least one of said dealer data records different than another said dealer data record;
    a clearing server configured to maintain a clearing data record of historical trades, said clearing data record comprising an actual traded price and yield for said bond;
    a terms database configured to maintain information associated with a plurality of bond issues;
    a lead dealer database configured to associate a lead dealer with each of said plurality of bond issues; and
    a quotation engine connected to said quotation servers, said clearing server, said terms database and said lead dealer database; said quotation engine configured to identify said lead dealer associated with said bond using said lead dealer database; said quotation engine configured to perform a plurality of operations based on said dealer data records, said clearing data, and said information; said plurality of operations configured to successively delete one or more of said dealer data records based on a comparison of said actual traded price and yield, a lead dealer price and yield quotation, and a remainder of said price and yield quotations; said quotation engine configured to determine a final price and yield by averaging price and yield quotations of surviving dealer data records.

2. The system of claim 1, wherein at least one of said plurality of operations is configured to delete said dealer data records having price and yield quotations greater than a predefined upper threshold or smaller than a predefined lower threshold.

3. The system of claim 2, wherein said predefined upper and lower thresholds are determined from one of said actual traded price and yield and said lead dealer price and yield quotation.

4. The system of claim 3, wherein said predefined upper threshold is between about 4% and about 25% higher than said one of said actual traded price and yield and said lead dealer price and yield quotation.

5. The system of claim 3, wherein said predefined lower threshold is between about 4% and about 25% lower than said one of said actual traded price and yield and said lead dealer price and yield quotation.

6. The system of claim 1, wherein said quotation engine is configured to perform said plurality of operations substantially immediately after receiving said clearing data record.

7. The system of claim 1, wherein said quotation engine is configured to perform said plurality of operations about thirty minutes after receiving said clearing data record.

8. The system of claim 1, wherein said quotation engine is configured to perform said plurality of operations before an expiry of said actual traded price and yield.

9. The system of claim 8, wherein said expiry of said actual traded price and yield is the beginning of a subsequent trading period.

10. The system of claim 1, wherein the quotation engine is further configured to transmit said final price and yield to at least one of said plurality of quotation servers.

11. The system of claim 10, wherein said quotation engine is further configured to transmit said final price yield to at least one of said plurality of quotation servers associated with said surviving dealer data records.

12. The system of claim 1 wherein said actual traded price and yield is from said clearing data record from a previous trading period.

13. The system of claim 1, wherein said plurality of operations are configured to calculate a standard deviation of price and yield quotations said dealer data, said calculations configured to delete said surviving dealer data records having price and yield quotations outside of the standard deviation.

14. The system of claim 1, wherein said plurality of operations are configured to determine a bid mean, price ask, yield bid and yield ask to determine a bid-and-ask price spread associated with said final price and yield.

15. A quotation engine comprising:
a memory storage unit;
a network interface for connecting to a quotation server, a clearing server, a terms database, and a lead dealer database; and
a processor configured to receive dealer data records, a clearing data record of historical trades, information associated with a plurality of bond issues, and a lead dealer associates with a bond; said dealer data record including a price and yield quotation for said bond, and said clearing data record including an actual traded price and yield for said bond; said quotation engine configured to identify said lead dealer associated with said bond using said lead dealer database; said processor configured to perform a plurality of operations based on said dealer data records, said clearing data, and said information; said plurality of operations configured to successively delete one or more of said dealer data records based on a comparison of said actual traded price and yield, a lead dealer price and yield quotation, and a remainder of said price and yield quotations; said processor configured to determine a final price and yield by averaging price and yield quotations of surviving dealer data records.

16. The quotation engine of claim 15, wherein at least one of said plurality of operations is configured to delete said dealer data records having price and yield quotations greater than a predefined upper threshold or smaller than a predefined lower threshold.

17. The quotation engine of claim 16, wherein said predefined upper and lower thresholds are determined from one of said actual traded price and yield and said lead dealer price and yield quotation.

18. The quotation engine of claim 15, wherein said predefined upper threshold is between about 4% and about 25% higher than said one of said actual traded price and yield and said lead dealer price and yield quotation.

19. The quotation engine of claim 15, wherein said predefined lower threshold is between about 4% and about 25% lower than said one of said actual traded price and yield and said lead dealer price and yield quotation.

20. The quotation engine of claim 15, wherein said processor is configured to perform said plurality of operations substantially immediately after receiving said clearing data record.

21. The quotation engine of claim 15, wherein said processor is configured to perform said plurality of operations about thirty minutes after receiving said clearing data record.

22. The quotation engine of claim 15, wherein said processor is configured to perform said plurality of operations before an expiry of said actual traded price and yield.

23. The quotation engine of claim 22, wherein said expiry of said actual traded price and yield is the beginning of a subsequent trading period.

24. The quotation engine of claim 15, wherein the processor is further configured to transmit said final price and yield to at least one of said quotation servers.

25. The quotation engine of claim 24, wherein said processor is further configured to transmit said final price yield to at least one of said quotation server associated with said surviving dealer data records.

26. The quotation engine of claim 15 wherein said actual traded price and yield is from said clearing data record from a previous trading period.

27. The quotation engine of claim 15, wherein said plurality of operations are configured to calculate a standard deviation of price and yield quotations said dealer data, said calculations configured to delete said surviving dealer data records having price and yield quotations outside of the standard deviation.

28. The quotation engine of claim 15, wherein said plurality of operations are configured to determine a bid mean, price ask, yield bid and yield ask to determine a bid-and-ask price spread associated with said final price and yield.

* * * * *